(No Model.)
T. G. COLEMAN.
SHAFT SUPPORT.
No. 592,466. Patented Oct. 26, 1897.
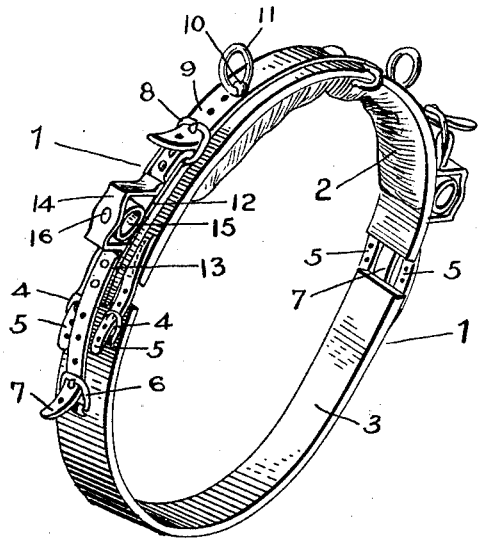
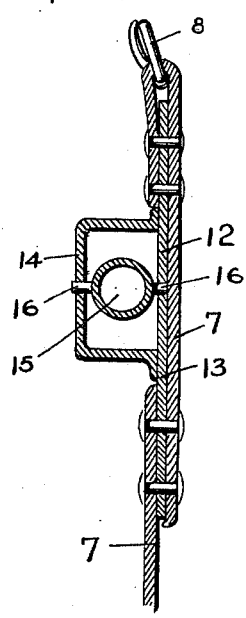
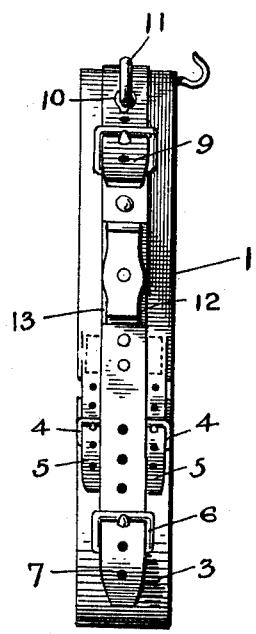
WITNESSES
INVENTOR
THOMAS G. COLEMAN.
By John Hedderburn
Attorney

UNITED STATES PATENT OFFICE.

THOMAS GARDNER COLEMAN, OF GUNSIGHT, TEXAS.

SHAFT-SUPPORT.

SPECIFICATION forming part of Letters Patent No. 592,466, dated October 26, 1897.

Application filed March 25, 1897. Serial No. 629,247. (No model.)

*To all whom it may concern:*

Be it known that I, THOMAS GARDNER COLEMAN, of Gunsight, in the county of Stephens and State of Texas, have invented certain new and useful Improvements in Harnesses; and I do hereby declare the following to be a full, clear, and exact description of the invention, such as will enable others skilled in the art to which it appertains to make and use the same.

This invention relates to harness, and has for its object to provide in connection with a harness-saddle means for accommodating the varying positions of the animal with respect to the shafts or thills, so as to remove all strain from and upon the shafts and the saddle, while at the same time effectively supporting the shafts and preventing the slipping of the same up and down upon the sides of the animal.

The detailed objects and advantages will be pointed out in the course of the subjoined description.

The invention consists in certain novel features and details of construction, as hereinafter fully described, illustrated in the drawings, and incorporated in the claim hereto appended.

In the accompanying drawings, Figure 1 is a perspective view of a harness-saddle constructed in accordance with the present invention. Fig. 2 is a longitudinal section through the same. Fig. 3 is an enlarged detail perspective view showing the swivel-eye and the strap upon which the same is mounted.

Similar numerals of reference denote corresponding parts in the several figures of the drawings.

Referring to the drawings, 1 designates a harness-saddle, which may be of any suitable construction and which is shown as provided upon its under side with a saddle-pad 2. 3 designates a girth or cinch-strap adapted to pass under the body of the animal and provided at its ends with buckles 4 to receive straps 5 at the ends of the saddle. The girth 3 is also provided intermediate the buckles 4 with other buckles 6 to receive the ends of the straps 7, to which the swivel-eyes are connected. The straps 7 carry at their upper ends buckles 8, adapted to engage with the opposite ends of an auxiliary strap 9, arranged outside of and connected to the upper central portion of the saddle 1. Connected to a suitable staple 10 are rings or loops 11 for the reception of reins or lines.

Mounted upon each strap 7, at a suitable point intermediate its ends, is a metal frame 12, consisting of a flat plate 13, riveted flatwise against the strap and having its end portions embedded in the strap or between folded portions of the strap, as shown. The frame also comprises a U-shaped piece of metal 14, having its ends arranged in the same plane and secured to the outer surface of the plate 13. Mounted in the U-shaped portion of the piece 14 and between it and the plate 13 is an eye 15, which is elongated in the form of a sleeve and adapted to receive one of the shafts or thills for supporting the same upon the animal. The eye 15 is provided with oppositely-projecting trunnions 16, which enter the plates 13 and 14 and swivel-eye and establish a swivel connection between said eye and the frame in which it is mounted. One of such eyes is provided at each side of the saddle, and they are intended to receive the shafts or thills of a sulky or cart, and by adjusting the straps 7 these eyes may be raised or lowered and brought to any desired point, according to the size of the animal, for giving the proper inclination to the shafts or thills.

The saddle is girthed tightly around the animal, so as to prevent any possibility of the saddle slipping. By swiveling the eyes into which the shafts or thills are received it will be seen that they will readily accommodate themselves to the angles of the thills, so that when the animal steps into a ditch or depression and rises out of the same the swivel-eyes will oscillate, and thereby prevent any strain from being put either upon the shafts or harness. In the same manner the swivel-eyes will accommodate themselves to the ever-varying movements of the animal, and will thus be much easier upon the animal.

Where the harness is used upon animals of different sizes, the positions of the swivel-eyes may be changed to suit the height of the animal and to give the proper inclination to the shafts or thills.

The improvement above described will be found of especial value when used in connection with one-wheel sulkies or carts, as it will serve to effectively brace and support the thills of such a cart or sulky and prevent the tipping of the same from side to side. In turning corners or swinging curves as the animal leans to one side the cart will also lean in a corresponding direction, the desirability of which will be readily apparent.

Having thus described the invention, what is claimed as new, and desired to be secured by Letters Patent, is—

A tug comprising a frame formed by the plate 12 and the angular plate 14 attached thereto, and the sleeve or ring 15 swiveled in said frame to receive the shaft, said sleeve being provided between its ends with lateral trunnions journaled in bearings located in horizontal alinement in the plates 12 and 14, whereby the sleeve is capable of a vertical rocking motion to conform to the varying inclinations of the shafts to the harness.

In testimony whereof I have signed this specification in the presence of two subscribing witnesses.

THOMAS GARDNER COLEMAN.

Witnesses:
B. B. GREENWOOD,
J. J. DOUGLASS.